United States Patent
Johnson

(10) Patent No.: US 11,148,886 B2
(45) Date of Patent: Oct. 19, 2021

(54) SYSTEM AND METHOD FOR PERISTALTIC TRANSPORT OF MATERIAL

(71) Applicant: Eidon, LLC, Mercer Island, WA (US)

(72) Inventor: Roger N. Johnson, Mercer Island, WA (US)

(73) Assignee: Eidon, LLC, Mercer Island, WA (US)

( * ) Notice: Subject to any disclaimer, the term of this patent is extended or adjusted under 35 U.S.C. 154(b) by 203 days.

(21) Appl. No.: 15/747,400

(22) PCT Filed: Jul. 22, 2016

(86) PCT No.: PCT/US2016/043733
§ 371 (c)(1),
(2) Date: Jan. 24, 2018

(87) PCT Pub. No.: WO2017/019560
PCT Pub. Date: Feb. 2, 2017

(65) Prior Publication Data
US 2018/0215549 A1 Aug. 2, 2018

Related U.S. Application Data

(60) Provisional application No. 62/196,820, filed on Jul. 24, 2015.

(51) Int. Cl.
*B65G 35/00* (2006.01)
*F04B 15/02* (2006.01)
(Continued)

(52) U.S. Cl.
CPC ............ *B65G 35/005* (2013.01); *F04B 15/02* (2013.01); *F04B 43/08* (2013.01); *F04B 43/088* (2013.01);
(Continued)

(58) Field of Classification Search
CPC ...... F04B 45/06; F04B 45/061; F04B 45/073; B65G 35/005
See application file for complete search history.

(56) References Cited

U.S. PATENT DOCUMENTS 2,829,600 A * 4/1958 Sveda ..................... F04B 43/10
417/394
3,261,556 A 7/1966 Antalik
(Continued)

FOREIGN PATENT DOCUMENTS

| DE | 894503 C | 10/1953 |
|---|---|---|
| EP | 2131492 A | 6/1984 |
| WO | 2017019560 A1 | 2/2017 |

OTHER PUBLICATIONS

Partial EPO Search Report for EP Application No. 16831162.9 dated Mar. 18, 2019; pp. all.
(Continued)

*Primary Examiner* — Peter J Bertheaud
*Assistant Examiner* — Geoffrey S Lee
(74) *Attorney, Agent, or Firm* — Makor Law Group, PLLC; Ronald Stern

(57) ABSTRACT

A peristaltic transport device comprising a tube member having an inner space to receive material, the member includes a series of repeating sections wherein each of the sections includes a plurality of bladders to selectively occlude portions of the inner space according to a defined peristaltic sequence to transport the material through the inner space. An actuator assembly is coupled to the tube member to control the selective occlusion of the inner space by selectively expanding and contracting ones of the plurality of bladders according to the defined peristaltic sequence. The actuator assembly simultaneously controls corresponding ones of the plurality of bladders across the series of repeating sections.

13 Claims, 8 Drawing Sheets

(51) Int. Cl.
    *F04B 49/22*     (2006.01)
    *F04B 43/08*     (2006.01)
    *F04B 43/113*     (2006.01)
    *F04B 43/10*     (2006.01)
    *F04B 43/12*     (2006.01)

(52) U.S. Cl.
    CPC ............ *F04B 43/10* (2013.01); *F04B 43/113* (2013.01); *F04B 43/1215* (2013.01); *F04B 43/1253* (2013.01); *F04B 49/22* (2013.01)

(56) References Cited

U.S. PATENT DOCUMENTS

| | | | |
|---|---|---|---|
| 3,649,138 A | 3/1972 | Clay et al. | |
| 3,818,487 A | 6/1974 | Brody et al. | |
| 3,862,629 A | 1/1975 | Rotta | |
| 4,025,121 A * | 5/1977 | Kleysteuber | B65G 35/005 406/96 |
| 5,040,955 A * | 8/1991 | Knutson | F04B 43/12 417/474 |
| 5,273,406 A * | 12/1993 | Feygin | F04B 43/10 417/474 |
| 6,435,849 B1 * | 8/2002 | Guilmette | F04B 43/06 417/330 |
| 7,141,071 B2 * | 11/2006 | Imran | A61F 2/04 623/23.64 |
| 2003/0065250 A1 * | 4/2003 | Chiel | A61B 34/70 600/115 |
| 2003/0210985 A1 * | 11/2003 | Feygin | B67D 7/00 417/46 |
| 2007/0093910 A1 * | 4/2007 | Imran | A61F 2/04 623/23.65 |
| 2014/0249644 A1 | 9/2014 | Imran | |

OTHER PUBLICATIONS

International Search Report and Written Opinion dated Oct. 14, 2016 for PCT Application No. PCT/US2016/043733.

* cited by examiner

| Bladder$_{n-1}$ | Bladder$_{n+1}$ | Bladder$_n$ |
|---|---|---|
| H | L | H |
| L | H | L |
| L | L | remain at current state |

370 (covers Bladder$_{n-1}$ and Bladder$_{n+1}$ columns — first bracket), 380 (second bracket)

FIG. 5

SYSTEM AND METHOD FOR PERISTALTIC TRANSPORT OF MATERIAL

CROSS-REFERENCE TO RELATED APPLICATIONS

This application is a 35 U.S.C. § 371 Stage Application of PCT Application No. PCT/US2016/043733, filed Jul. 22, 2016, which claims the benefit of U.S. Application No. 62/196,820, filed Jul. 24, 2015 entitled "SYSTEM AND METHOD FOR PERISTALTIC TRANSPORT OF MATERIAL," The afore-mentioned applications are incorporated herein by reference, in their entirety, for any purpose.

SUMMARY

According to one aspect, a peristaltic transport device comprising a member having an inner space to receive material, the member includes a series of repeating sections wherein each of the sections includes a plurality of bladders to selectively occlude portions of the inner space according to a defined peristaltic sequence to transport the material through the inner space; and an actuator assembly to control the selective occlusion of the inner space by selectively expanding and contracting ones of the plurality of bladders according to the defined peristaltic sequence, the actuator assembly simultaneously controls corresponding ones of the plurality of bladders across the series of repeating sections.

According to another aspect, a peristaltic transport device comprising a tube member having an inner space to receive material, the member includes a series of repeating sections having respective ones of a plurality of rollers coupled thereto to occlude portions of the inner space according to a defined peristaltic sequence to transport the material through the inner space; and an actuator assembly to move the plurality of rollers along the tube member, the actuator assembly simultaneously controls corresponding ones of the plurality of rollers across the series of repeating sections to selectively occlude portions of the inner space.

BRIEF DESCRIPTION OF THE DRAWINGS

Reference will now be made to the attached drawings, when read in combination with the following specification, wherein like reference numerals refer to like parts throughout the several views, and in which:

FIG. 1A is schematic illustration of a peristaltic transport system to transport material through a tube member by way of a controlled air supply, while FIG. 1B shows a cross-sectional illustration of the tube member, according to one embodiment.

FIG. 3A is a schematic illustration of a peristaltic transport system to transport the material through the tube member by way of a common air supply, while FIG. 3B shows a cross-sectional schematic illustration of the tube member, according to one embodiment.

FIG. 4 is a schematic illustration of a "smart" peristaltic transport system to transport the material through the tube member by way of a common air supply line coupled to a plurality of control valves, while FIG. 4B shows a cross-sectional schematic illustration of the tube member, according to one embodiment.

FIG. 5 is a logic table illustrating actuation of a bladder based on first and second control signals received at a corresponding control valve, according to one embodiment.

DETAILED DESCRIPTION

Figure 1:
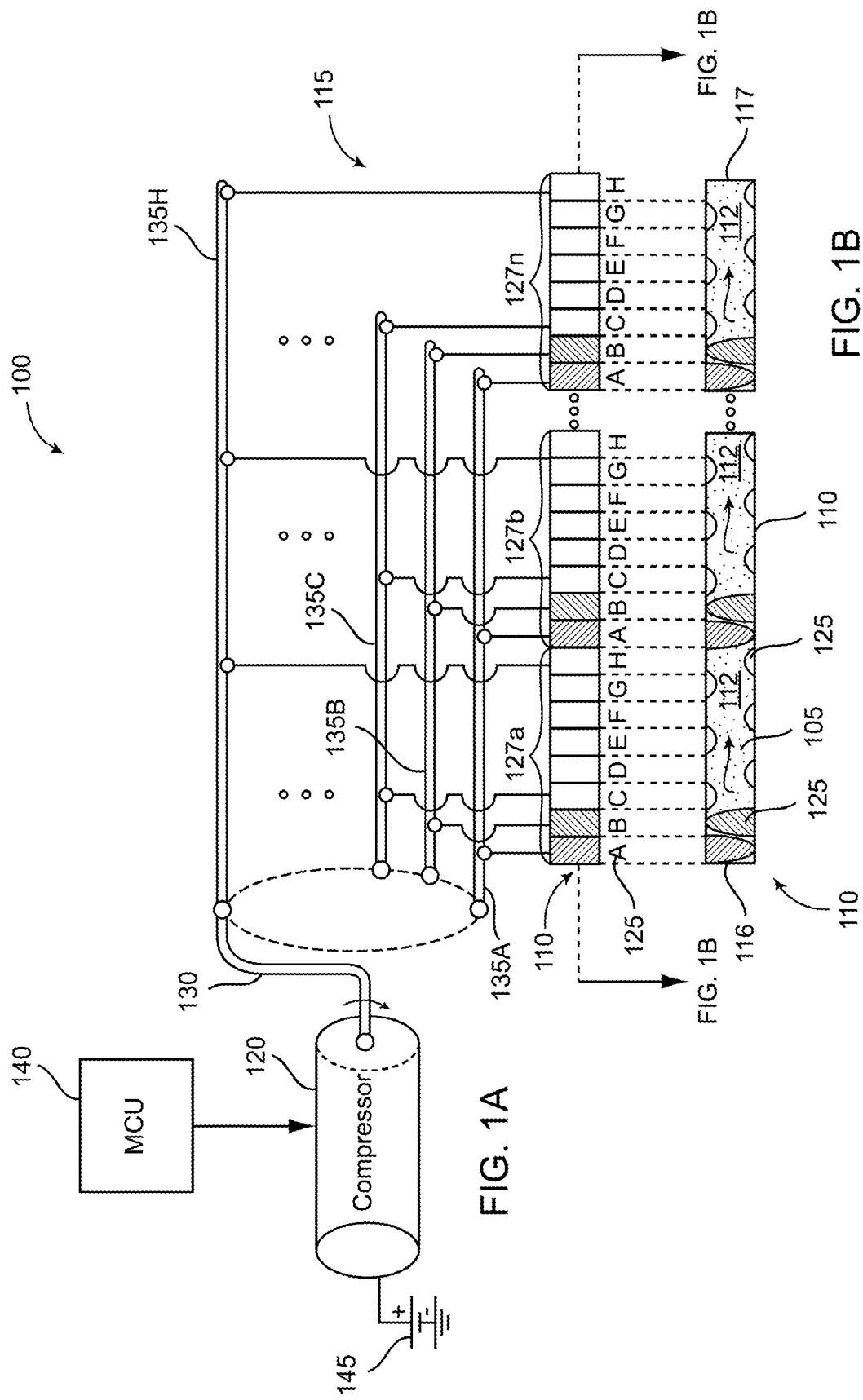

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

The transport of fecal waste is at the heart of the sanitation process. Humans and animals consume food to obtain nutrients via a peristaltic process that ultimately results in fecal sludge (FS). Once the FS leaves a body it's transported away to eventually be reincorporated into the environment. The method employed to transport FS is the primary function of sanitation systems and is a significant driver of costs, reliability, adoptability, and functionality.

Currently, most communities rely on the flush toilet with its excessive use of water to power the waste transport and associated infrastructure requirements. Gravity is weak compared to the viscosity of FS and is barely able to flatten out a slug of waste. A large amount of water and piping infrastructure is required to provide a setting where waste will travel through the water trap, into the waste pipes (which are vented to allow for plug flow) and finally down to the sewer line. Sewers are dug underground as they have to be lower in order to keep the waste flowing. Eventually the waste has to be raised up for transport to a recycle plant or discarded at an even lower disposal site. The flush latrine system is complicated, expensive and rarely applicable to the developing world.

Other sanitation options exist and all those options are impacted by the FS transport design employed. They vary from pit latrines, where one carries their waste to the defecation site, to simple bag capture devices that require hand carrying the waste away to temporary storage. The pit latrine, for example, functions as a temporary holding tank to be emptied periodically. Periodically emptying the holding tank presents significant challenges such as access by transport vehicles and extraction challenges because of varying consistency of the FS. Alternatively, the FS is occasionally vacuumed up (with varying levels of effectiveness) and often hand dug up.

It would be desirable to have a transport system that would allow for transport of FS without the use of transport vehicles, human lifting, or heavy water. Additionally it's desirable the transport system functions without added water, maintains the ability to transport FS upward and/or downward, adequate throughput, adequate tolerance of a range of human waste, and completely sealed from the environment (i.e., eliminates odors). Optimal system metrics include minimal infrastructure or site changes (i.e., no digging), local energy sources and/or human power, and low energy use. Adoptability criteria include the availability of local materials, manufacturing abilities, total cost and the ease of conceptual adoption. Meeting most of these criteria would have a very positive impact on the sanitation options.

Consequently, there is a need for a peristaltic transport system which could readily transport sludge across long distances—whether upward, downward, or lateral transport—without exerting outside human force.

A natural occurrence in human bodies is the ingestion of food and creation of a sludge that is transported and mixed as it passes through intestines so that nutrients can be absorbed. The muscle driven traveling constriction created by our intestines is called "peristalsis" and is employed by nearly every animal ranging in size from microscopic worms to blue whales. Peristalsis within an animal or human is able to move fecal sludge with low pressures, limited energy, and great robustness.

According to a sample embodiment, a transport mechanism that implements peristaltic transport includes a flexible waterproof pathway for the FS that is acted upon by sections able to periodically occlude the inner channel. A design based on this allows for the traveling constriction and the movement of sludge. Many factors affect the optimal number and size of the active sections and their power supply. Some factors include options in power, material, manufacturing, and performance.

Another example embodiment includes inflatable air bladders to provide muscle force. The air bladders may be made of non-stretch airtight membranes such as heat wieldable reinforced poly tarps. The air bladders may be connected to multiple air channels and inflate in periodic sections. Two sets of these segmented bladders are stacked so as to create an internal cavity occluded by individual inflations. Sequentially inflating the air channels creates an alternating occlusion to the inner cavity that mimics the traveling muscle constriction of peristalsis. An inflating bladder swells to a circular cross section completely collapsing the non-pressurized opposing bladder and the internal cavity between them. Power may be supplied by 5-10 psi air from bellows, pumps, and vehicle exhausts. These pressures limit bursting forces and accommodate repairs.

The peristaltic transport system can have embodiments that act on the transported material in addition to physical relocation. For example, the material passing through the transport system may be thoroughly mixed as a result of the action of the segmented occlusions. On occasion, the direction of flow can be reversed expressly for the purpose of homogenizing the material. Additionally, the system is useful in a mixing application where contents are drawn in, mixed and then discharged from the same end. Other actions can be carried out by the sidewall's interaction with the transported material. The primary purpose of the intestine is to bring food content into direct contact with the absorbing walls for nutrient extraction, after which the spent food is eliminated. Sidewall interactions can include removal of contained liquids and absorption of other agents able to modify the transported material. A porous sidewall to the inner lumen that caries the transport material may be porous such that coarse or non-liquid contents can be separated by the cavity occlusion processes. A sidewall made of osmotic material draws non-salt water out of the tube if the outside of the material were immersed in salt water. Alternatively substances can be introduces into the flow in order to change it. For example, a peristaltic driven bio-digesting system could introduce a variety of bacteria strains at various stages of the transported material to enhance complete breakdown and biogas generation. The large surface area contact with the transported material by the peristaltic system also provides great thermal processing options. When used as a sanitation device this provides the ability to pasteurize the material according to required "time at temperature" demands.

Figure 2:
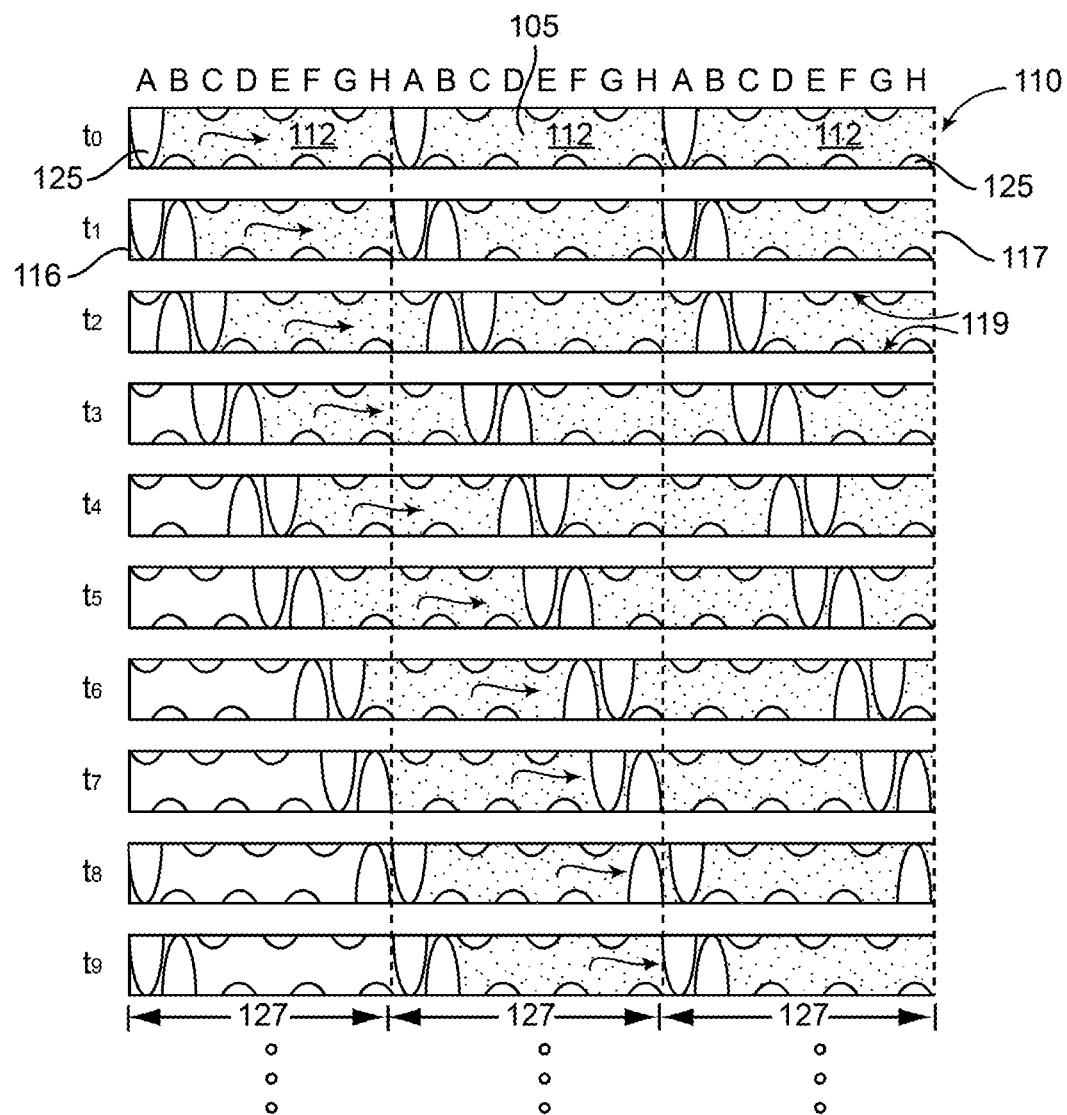
FIG. 2 is a cross-sectional schematic illustration of the tube member implementing a peristaltic sequence, according to one embodiment.

FIG. 1A shows a schematic illustration of a peristaltic transport system 100 to transport material 105 through a tube member 110 by way of a controlled air supply, while FIG. 1B shows a cross-sectional illustration of the tube member 110, according to one embodiment. The peristaltic transport system 100 comprises an actuator assembly 115 coupled to the tube member 110. The actuator assembly 115 controls the transport of the material 105 through the tube member 110 by causing selective occlusion of an inner space 112 within the tube member 110. The selective occlusion constricts volume capacity of the inner space 112 and propagates this volume constriction along the tube member 110. The actuator assembly 115 functions to occlude the inner space 112 according to a defined peristaltic sequence as illustrated in FIG. 2 and discussed in detail below.

The selective occlusion of the inner space 112 causes the resulting propagated volume constriction to transport the material 105 from a receiving end 116 of the tube member 110 toward an output end 117. The receiving end 116 configured to receive an initial influx of the material 105 while the output end 117 serves to output the material into, for example, a receptacle. The material 105 being transported through the tube member 110 may, for example, comprise fecal sludge, mud, sewage, cement, oil, gasoline, viscous mixture of liquid and solid components, or any other slurry.

The actuator assembly 115 comprises a compressor 120 to supply air to respective ones of a plurality of bladders 125 (individually referenced 125A-125H, respectively, and collectively referred to herein as 125) disposed within the tube member 110, a supply valve 130 that may be actuated to selectively supply air to respective ones of the plurality of bladders 125, a microcontroller unit (MCU) 140 to control the compressor 120 and the supply valve 130, and a power supply 145 to power the compressor 120.

The tube member 110 can be divided into repeating sections 127a, 127b, . . . , and 127n (collectively referenced 127), each of which include its own set of the plurality of bladders 125. For example, in the illustrated embodiment of FIG. 1A, each section 127 has a set of eight bladders 125A, 125B, 125C, . . . , and 125H. It will be obvious to those of ordinary skill in the art that other embodiments may include more or less bladders within the sections 127 of the tube member 110. Although the tube member 110 may be divided into sections 127, the sections of the tube member 110 are connected such that the material 105 may pass from one end of the tube member 110 to the opposite end without any leakage. Additionally, the sections 127 allow for modular design and construction of the tube member 110. The tube member 110 may take the form of a tube, pipe, sleeve, or the like and may be of non-permeable material to prevent the transported material from penetrating the tube member 110 surface and entering the surrounding environment. Additionally, the tube member 110 may be flexible to allow for placement throughout uneven terrain and varying levels of incline, as well as uneven surfaces.

The tube member 110 may comprise sidewalls that are flexible in that it changes shape to occlude the inner space 112. Flexible materials can vary in their ability to flex or stretch. Flexible materials include all manner of plastic films and coated fabrics. Peristaltic systems using flexible material may accommodate length changes caused by bladder inflations. Stretchable materials such as urethanes and rubbers can be used as long as the design accommodates the material's stretch limits. This is best illustrated by the inability to inflate a chain of balloons at the same rate—the first to begin inflating will fully inflate before others due to the ease of inflating into large curved surface relative to small ones. Materials may hold the pressurized contents without rupturing and while remaining sealed at joints. Seams made with lap joints can use the large contact area to distribute forces to the materials where shear forces are lower while seams attached along a seam (as in thermal welding two sheets together) concentrate the rupturing forces concentrated along a peel line. Accommodating the seams required to construct a peristaltic system may incorporate the design limits for materials.

The compressor 120 supplies air to the plurality of bladders 125 via one or more supply lines 135A, 135B, 135C, . . . , and 135H (collectively 135) selectively coupled to the supply valve 130. The supply lines 135 and the plurality of bladders 125 are arranged such that a single supply line simultaneously supplies air to corresponding ones of the bladders 125 across each of the repeating sections 127. For example, in response to the supply valve 130 selecting supply line 135A, the compressor 120 supplies air throughout the supply line 135A and all first bladders 125A are inflated simultaneously across the repeating sections 127. Conversely, all the first bladders 125A may be deflated simultaneously upon opening the supply line 135A to the atmospheric and allowing air from the first bladders 125A to vent out.

The compressor 120 may take the form of a pump or any other traditional air compressor unit that can supply compressed air to the supply valve 130. The supplied air may have a higher pounds per square inch (PSI) pressure than the air pressure within the supply line 135 and respective ones of the bladders 125. As an example, the PSI pressure within the plurality of bladders 125 may be in the range of 1-15 PSI. In one embodiment the compressor 120 may take the form of an electric powered compressor charged via the power supply 145, where the power supply 145 takes the form of at least one of a DC battery source, an AC outlet, solar panels, wind power, hydro-electric source, or the like. Alternatively and/or additionally, the compressor 120 may take the form of a vehicle exhaust pipe or bellows.

As mentioned above, the MCU 140 is operable to control the compressor 120 and the supply valve 130 to selectively deliver pressurized air to respective ones of the plurality of bladders 125. The MCU 140 may comprise a small computer on a single integrated circuit having a processor core, memory, and programmable input/output peripherals. The MCU 140 may be programmed to implement the defined peristaltic sequence, illustrated in FIG. 2 and defined in detail below, in response to receiving 116 an initial user input.

As illustrated in FIG. 1A, the supply valve 130 may take the form of a rotating valve having a mechanical arm which is selectively rotated to connect with respective ones of the supply lines 135. Alternatively, the supply valve 130 may comprise a valve having a plurality of openings connected to respective ones of the plurality of supply lines 135. In this alternative embodiment, the valve might include a rotatable wiper that covers all but one of the plurality of openings. As such, although all the compressor 120 air supply is received at the supply valve 130, only the uncovered opening will allow supplied air from the compressor 120 to fill the corresponding supply line 135. The rotatable wiper may control exhaust timing related to the plurality of bladders 125 filled with air. For example, it may fill a first supply line 135A and associated first bladders 125A, then rotate to fill a second supply line 135B and associated second bladders 125B while keeping the first bladders 125A filled, and then may rotate to fill a third supply line 135C and associated third bladders 125C while simultaneously causing the first bladders 125A to empty. It will be understood by those skilled in the art that various other embodiments of supply valves may be implemented to selectively transfer supplied air from the compressor 120 to the supply lines 135 and to exhaust air.

The supply lines 135 may take the form of flexible or rigid material capable of receiving air, gas, water, or the like for the purpose of filling respective ones of the bladders 125. The supply lines 135 may be made of the same material as the tube member 110. The supply lines 135 may be designed to bring the pressurized air, gas, or liquid to the sequence of bladders 125 in adequate volume to provide adequate transport speeds. In other words, the supply lines 135 are configured to hold the required pressures and can be collapsible. In some cases, the supply lines 135 also function as exhaust lines, in which case the supply line tubes 135 are protected from compression. When the peristaltic system 100 is one that routes the supply and exhaust lines within the transported material space or inner space 112, the peristaltic system 100 design includes lines 135 that can withstand the occluding pressures of the operating peristaltic system 100. This may result in the supply lines 135 being rigid in response to crushing pressure.

As noted above, respective ones of the supply lines 135 are connected with corresponding ones of the plurality of bladders 125 across the repeating sections 127. For example, the supply line 135A interconnects the 125A bladders located within each of the sections 127 of the tube member 110. As such, it can be noted that the 125A bladders across the repeating sections 127 have the supply line 135A as a common supply line. Of course, the same can be said for the remaining supply lines 135B-135H and their corresponding bladders 125B-125H across the repeating sections 127 of the tube member.

The common supply line arrangement for corresponding bladders 125 across the repeating sections 127 allows for simultaneous occlusion or opening of the inner space 112 of the tube member 110 at different locations throughout the tube member 110. The ability of the peristaltic system 100 to transport the material 105 in one direction and vertically against gravity includes some level of occlusion. The intruding part of the system 100 causes displacement of the material 105. For example, when the material 105 is blocked in one direction it will move in an opposite direction. One outcome of occlusion at multiple points along a transport tube is that the cumulative effect of back pressure (often caused by head pressure) can be reduced and eliminated. In the case of transporting a fluid vertically, each occlusion need only support the fluid in its immediate cavity by transferring the forces to the tensile strength of the tube wall. The tube member 110 may still carry the weight of total fluid, but not by pressure transmission within the fluid. As long as each repeating section 127 of the peristaltic tube 110 remains occluded during cycling, pressures do not accumulate. Consequently, at some point, a second adjacent cavity will reach occlusion before the current cavity can be released. Should complete occlusion not be reached backflow will occur without accumulating pressure as long as the last cell is free to "slip" as well. This means that a water column of 300' that normally creates a head pressure of 130 psi at the bottom can be designed to move water in segments that create only ½ psi. This simplifies many design problems of dealing with high pressures otherwise required.

FIG. 2 shows a cross-sectional schematic illustration of the tube member 110 at discrete times $t_0$-$t_9$ during the peristaltic sequencing of occlusions through the inner space 112 of the tube member 110, according to one illustrated embodiment.

The actuator assembly 115 may cause selective ones of the plurality of bladders 125 to expand and contract according to the defined peristaltic sequence illustrated in FIG. 2. Respective ones of the plurality of bladders 125 may be expanded to fill at least a portion of a volume of the inner space 112 of the tube member 110. Such expansion causes the occlusion within the inner space 112 and ultimately shifts the material 105 toward the output end 117 of the tube member 110. In particular, during occlusion, a first one of the plurality of bladders 125A may be expanded to abut against an inner wall 119 of the tube member 110. Additionally, a second one of the plurality of bladder 125B, positioned adjacent the first bladder 125A, may be expanded to abut against the adjacent expanded first bladder 125A as well as the inner wall 119 of the tube member 110. The expanded second bladder 125B causes the material 105 to be incrementally transported away from the first bladder 125A and toward the output end 117.

The peristaltic sequence illustrated in FIG. 2 results from consecutive expansion of the first and second bladders 125A and 125B, respectively, in each of the repeating sections 127 of the tube member 110, simultaneously. This consecutive expansion of the first and second bladders 125A, 125B is propagated along the plurality of bladders 125 concomitantly with corresponding first and second bladders 125A, 125B in each of the repeating sections of the member. Additionally, the consecutive expansion of the first and second bladders 125A, 125B propagated along the plurality of bladders 125 in each of the repeating sections 127 is followed by consecutive compression of the first and second bladders 125A, 125B.

For example, referring to FIG. 2, at $t_0$ and $t_1$ the first and second bladders 125A, 125B are inflated across each of the sections 127. Then at $t_2$ to $t_3$, the first and second bladders 125A, 125B (which were previously inflated) are now consecutively deflated or compressed, while the following bladders 125C, 125D are consecutively expanded across the sections 127. These expansion/compression actions are propagated along the inner space 112 of the tube member 110 as depicted at $t_4$ to $t_9$. As can be seen in FIG. 2, the propagating expansion/compression actions of the plurality of bladders 125 cause the propagating volume constriction along the tube member 110. In response to the propagating volume constriction, the material 105 is peristaltically transported to the output end 117.

Figure 3:
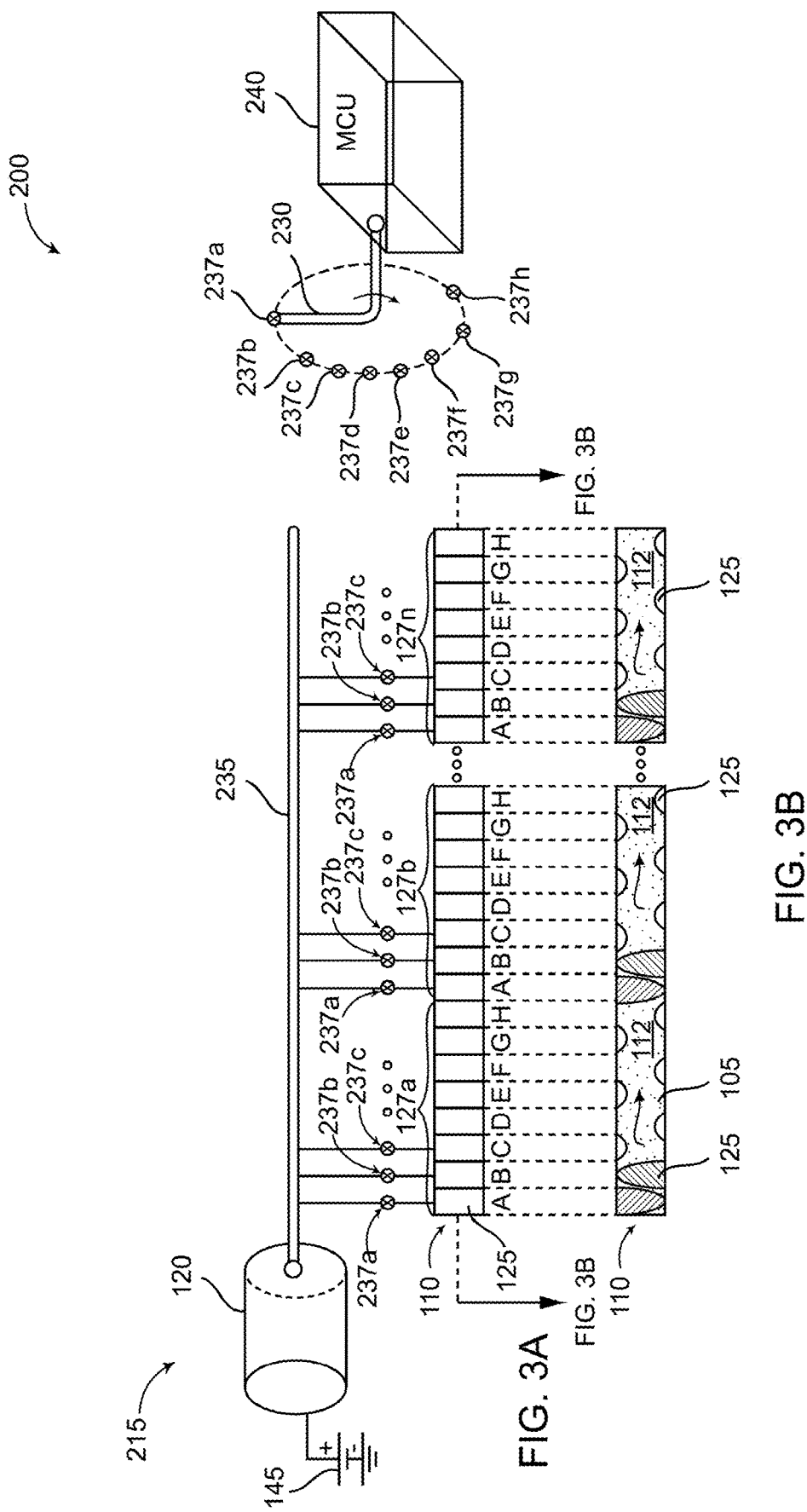

FIG. 3A shows a schematic illustration of a peristaltic transport system 200 to transport the material 105 through the tube member 110 by way of a common air supply 235, while FIG. 3B shows a cross-sectional schematic illustration of the tube member 110, according to one embodiment. It will be noted that similar or identical components and structures appearing in previous figures will not be described in detail so as not to obscure the essence of the additional embodiment. Rather, detailed description of additional and/or different functioning components and inter-connections will be described in detail.

The peristaltic transport system 200 comprises an actuator assembly 215 coupled to the tube member 110. Similarly to FIG. 1A, the actuator assembly 215 controls transport of the material 105 through the tube member 110 by causing selective occlusion of an inner space 112 within the tube member 110. The selective occlusion constricts volume capacity of the inner space 112 and propagates this volume constriction along the tube member 110. The actuator assembly 215 functions to occlude the inner space 112 according to the defined peristaltic sequence illustrated in FIG. 2 and as discussed in detail above.

The actuator assembly 215 comprises a compressor 120 to supply air to a single supply line 235 common to all the plurality of bladders 125, a plurality of valves 237a, 237b, . . . and 237h (collectively referenced 237) to control access of the supplied air from the supply line 235 to each of the plurality of bladders 125, and a microcontroller unit (MCU) 240 programmed to cause the valves 237 to operate such that corresponding bladders 125 expand and contract according to the defined peristaltic sequence (See FIG. 2). The supply line 235 may, for example, supply air at around 100 PSI while air pressure within ones of the bladders 125 is around 1-5 PSI.

The tube member 110 may be divided into repeating sections 127a, 127b, . . . , 127n (collectively 127), each of which includes its own set of the plurality of bladders 125 and the plurality of valves 237. Each of the plurality of valves 237 simultaneously controls the supply of air to/from corresponding ones of the bladders 125 across each of the repeating sections. For example, as illustrated in FIG. 3A, each section 127 has a set of eight bladders 125A-125H and a set of eight valves 237a-237h, respectively. The plurality of valves 237 are arranged such that a first one of the valves 237a simultaneously controls air flow to/from a first one of the bladders 125A across each of the repeating sections 127.

As mentioned above, the MCU 240 is operable to signal the respective valves 237 to expand or compress corresponding bladders 125. The valves 237 cause expansion by allowing air flow from the single supply line 235 into the respective bladders 125, and compression by opening a vent to the atmosphere. The MCU 240 may operate to signal the valves 237 pneumatically, mechanically, and/or electronically. As illustrated in FIG. 3B, the MCU 240 may, for example, be coupled to a rotating mechanical arm 230 which serves to mechanically couple the MCU 240 with respective ones of the plurality of valves 237. The rotating arm 230 is operable to connect to each of the valves 237 one at a time. For example, when the mechanical arm 230 is coupled to the first valve 237a, the MCU 240 signals the first valve 237a across each of the sections 127 to allow air flow from the supply line 235 into the corresponding first bladder 125A across each of the sections 127. After the MCU 240 signals a second valve 237b to inflate a second bladder 125B it signals the first valve 237a to vent air from the first bladder 125A to the atmosphere. While the venting of the first bladder 125A takes place, the MCU 240 signals third valve 237c to inflate third bladder 125C. This continuation of this inflate/vent cycle across the bladders 125 of the repeating sections 127 is what implements the peristaltic sequence illustrated in FIG. 2. The MCU 240 may, for example, signal respective valves 237 by way of a pilot air supply or electric signal.

The valves 237 may be located remote from the MCU 240. In such embodiment the MCU 240 might be communicatively coupled to the valves 237. For example, the MCU 240 may transmit communication signals to respective ones of the valves 237. These transmitted signals energize respective ones of the valves 237 to allow the supply line 235 to provide air to corresponding ones of the bladders 125 or to vent air from the corresponding bladder 125 to the atmosphere.

Figure 4:
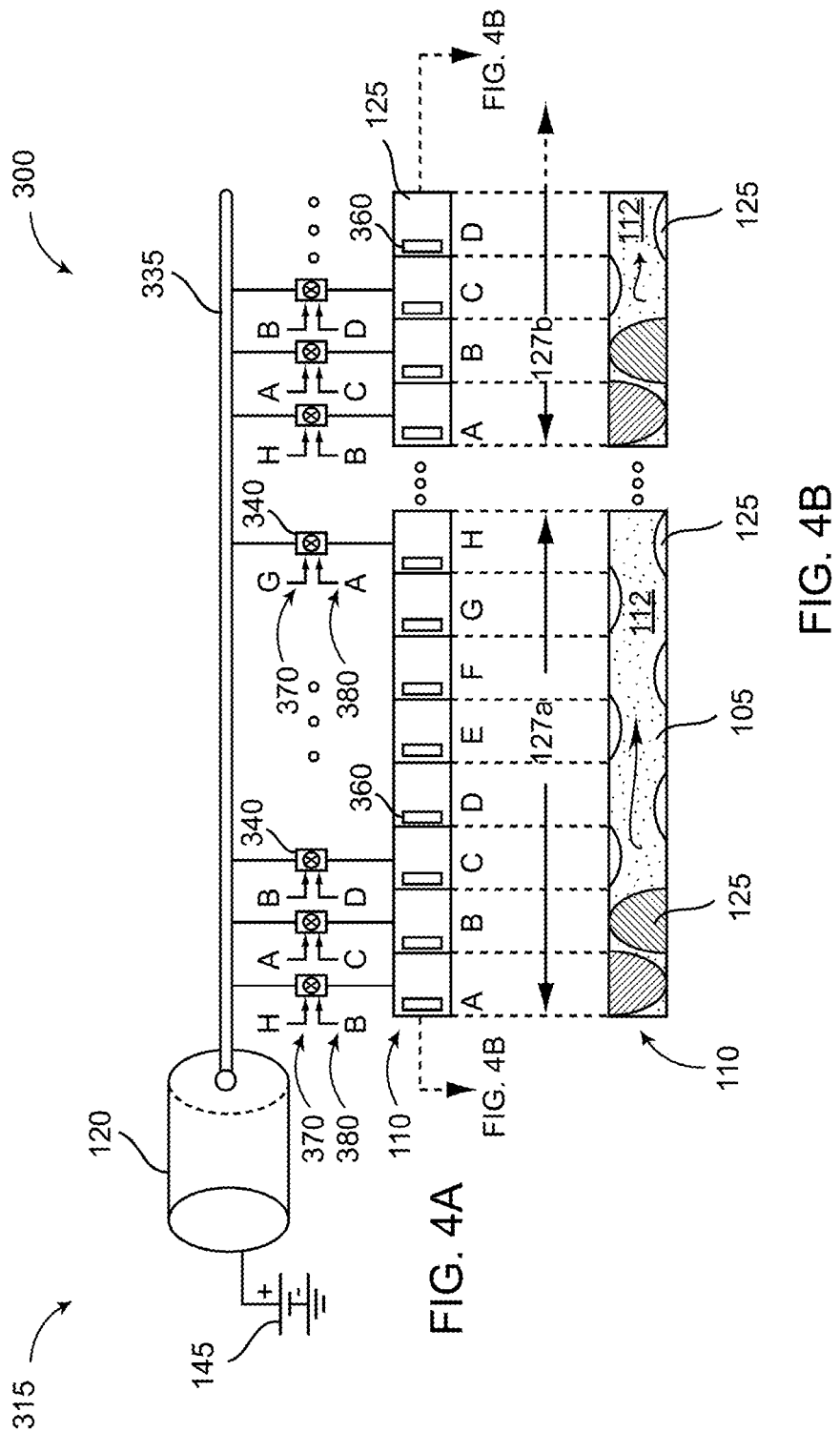

FIG. 4A shows a schematic illustration of a "smart" peristaltic transport system 300 to transport the material 105 through the tube member 110 by way of a common air supply line 335 coupled to a plurality of control valves 340, while FIG. 4B shows a cross-sectional schematic illustration of the tube member 110, according to one embodiment. It will be noted that similar or identical components and structures appearing in previous figures will not be described in detail so as not to obscure the essence of the additional embodiment. Rather, detailed description of additional and/or different functioning components and inter-connections will be described in detail.

The "smart" peristaltic transport system 300 comprises an actuator assembly 315 coupled to the tube member 110. Similarly to the embodiment described in FIGS. 1A and 3A, the actuator assembly 315 controls transport of the material 105 through the tube member 110 by causing selective occlusion of an inner space 112 within the tube member 110. The selective occlusion constricts volume capacity of the inner space 112 and propagates this volume constriction along the tube member 110. The actuator assembly 215 functions to occlude the inner space 112 according to the defined peristaltic sequence illustrated in FIG. 2 and as discussed in detail above.

The actuator assembly 315 comprises the compressor 120 to supply air to the single supply line 335 common to all the plurality of bladders 125, and the plurality of control valves 340 to control expansion and compression of corresponding bladders 125 in response to detected pressure within neighboring bladders 125. The plurality of control valves 340 receive control signals in response to activation of respective ones of pressure sensors 360A, 360B, . . . 360H (collectively referenced 360) embedded within the plurality of bladders 125. The pressure sensors 360 may, for example, take the form of small blisters such that in response to expansion of a respective bladder 125, the blister 360 is compressed. The compressed blister 360 emits a control signal transmitted as a control input to the appropriate control valve 340. In the event no compression of the blister 360 occurs, then a control input indicating non-inflation or compression of the corresponding bladder 125 is transmitted as the control input to the appropriate valve 340. In another embodiment, the pressure sensors 360 may be operable to detect and/or measure pressure within respective ones of the bladders 125. Based on the detected pressure, the pressure sensors 360 transmit the control inputs to the appropriate control valves 340. The control input signals indicate whether the corresponding pressure sensor 360 detected an inflated or compressed bladder 125. It will be understood to those of ordinary skill in the art that any type of pressure sensor such as, for example, mechanical, electrical, and pneumatic may be used to provide a control signal to respective valves 340. Additionally and/or alternatively, the blisters 360 may be disposed within the inner space 112 of the tube member 110 and outside the plurality of bladders 125.

The control valves 340 are coupled to respective ones of the bladders 125 such that each of the valves 340 controls air flow to/from corresponding ones of the bladders 125. Each of the valves 340 controls expansion/compression of its corresponding bladder 125 based on the detected state of the bladder 125 located immediately before and immediately after that corresponding bladder 125 (as described in more detail below). As such, the control valves of FIG. 4A may be referred to as "smart" valves. The control valves 340 facilitate expansion of corresponding bladders 125 by allowing passage of air from the supply line 335 to the corresponding bladder 125. Additionally, the control valves 340 facilitate compression of corresponding bladders 125 by venting air from within the bladder 125 to the atmosphere. The control valves 340 may comprise a small computer on a single integrated circuit having a processor core, memory, and programmable input/output peripherals which are used to control an embedded valve.

FIG. 5 shows a logic table illustrating actuation of one of the plurality of bladders 125 based on first and second control signals 370, 380, respectively, received at a corresponding control valve 340, according to one embodiment. Reference will now be made to the table in FIG. 5 in conjunction with FIG. 4A. Each of the control valves 340 receives the first and second control signals 370, 380, respectively, to determine the proper control of air to/from a corresponding bladder 125 ("Bladder$_n$"). The first control signal 370 stems from a first one of the sensors 360 disposed within an adjacent prior bladder 125 ("Bladder$_{n-1}$"), while the second control signal 380 stems from a second one of the sensors 360 disposed within an adjacent subsequent bladder 125 ("Bladder$_{n+1}$"). In response to the received first and second control signals, each of the control valves 340 will cause the corresponding bladder 125 ("Bladder n") to inflate, deflate, or remain unchanged from its current state.

In particular, each of the control valves 340 will follow the control rules outlined in FIG. 5 when determining whether to inflate, deflate, or leave Bladder$_n$ unchanged. The control rules implemented by the control valves 340 comprise three logic scenarios: (1) Bladder$_{n-1}$ is expanded ("H") while Bladder$_{n+1}$ is compressed ("L"); (2) Bladder$_{n-1}$ is compressed ("L") while Bladder$_{n+1}$ is expanded ("H"); and (3) both Bladder$_{n-1}$ and Bladder$_{n+1}$ are compressed ("L").

In light of the three logical scenarios discussed above, respective ones of the control valves 340 will:

[A] inflate Bladder$_n$, in response to scenario (1);
 [B] deflate Bladder$_n$, in response to scenario (2); and
 [C] will not cause a change to the compressed/expanded state of Bladder$_n$, in response to scenario (3).

Implementing the above logic rules based on the detected state of the bladder 125 located immediately before (Bladder$_{n-1}$) and immediately after (Bladder$_{n+1}$) respective control valves 340 across repeating sections 127 of the tube member 110 will cause a self-propagating inflation wave. The self-propagating wave will implement the defined peristaltic sequence discussed above and illustrated in FIG. 2. In this manner the self-propagating wave will propagate at a speed allowed by full inflation status of respective ones of the bladders 125. Consequently, thicker material 105 will flow slower and take longer to trigger the successive inflations of the peristaltic sequence.

The self-propagating wave of the peristaltic sequence may be initiated by a manual trigger. For example, a user initiates the peristaltic sequence by causing the first bladder 125A across the repeating 127 to inflate—either manual inflation or sending an appropriate trigger signal to the corresponding ones of the control valves 340A. After that, the peristaltic wave of constricting the inner space 112 of the tube member 105 is set into motion until manual interruption by a user or the control valves 340 are automatically programmed to stop the process. Additionally, it should be noted that once the peristaltic sequence is set into motion (after manual or automatic triggering), the control valves 340A having the corresponding first bladder 125A, will receive its first control signal 370 from the sensor 360H disposed within bladder 125H and its second control signal from the sensor 360B disposed within bladder 125B.

Figure 6:
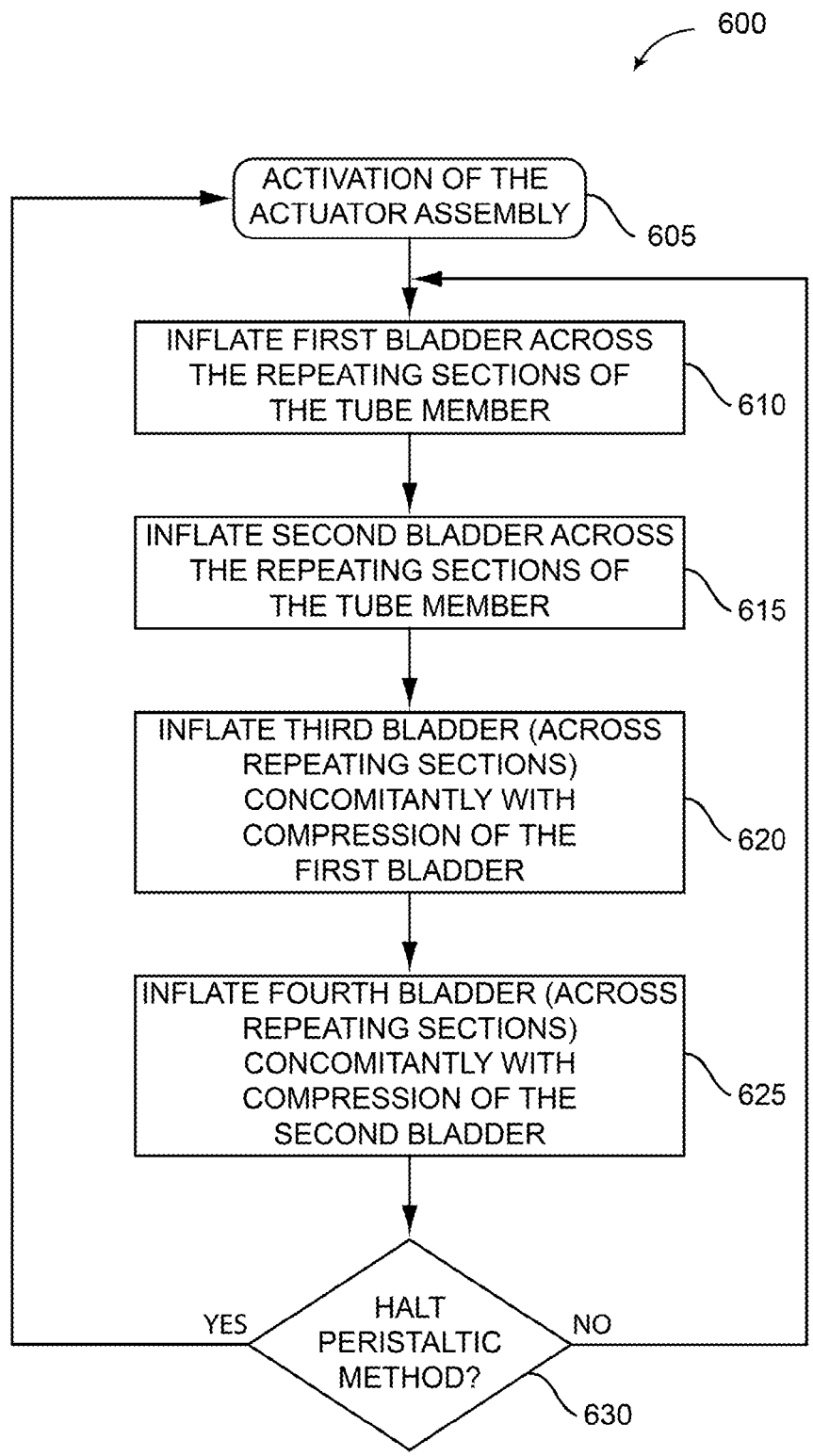
FIG. 6 is a flowchart of a peristaltic method illustrated in FIG. 2 and implemented by any one of a controlled air supply, common air supply, or "smart" peristaltic transport system, according to one embodiment.

FIG. 6 is a flowchart of a peristaltic method 600 illustrated in FIG. 2 and implemented by any one of a controlled air supply, common air supply, or "smart" peristaltic transport system 100, 200, 300, respectively, according to one embodiment. At 605, the method 600 begins in response to a manual or automatic activation of the actuator assembly 115, 215, 315 to cause peristaltic transport of the material 105 through the tube member 110. For example, a user might decide to initiate the peristaltic process or the actuator assembly 115, 215, 315 may be programmed to begin actuation at a defined day and time.

At 610, the first bladder 125A, located across all repeating sections 127, may be expanded to abut substantially against an inner wall 119 of the tube member 110, thereby causing occlusion within the inner space 112 and ultimately begins to shift the material 105 toward the output end 117 of the tube member 110.

At 615, the second one of the plurality of bladders 125B, located across all repeating sections 127 and positioned adjacent the first bladder 125A within each section 127, may be expanded to abut against the adjacent expanded first bladder 125A as well as the inner wall 119 of the tube member 110. The expanded second bladder 125B causes the material 105 to be incrementally transported away from the first bladder 125A and toward the output end 117.

At 620, in response to the second bladder 125B being fully expanded and occluding the inner space 112, a subsequent third bladder 125C (across all repeating sections 127 of the tube member 110) expands concomitantly with compression of the first bladder 125A.

At 625, in response to the third bladder 125C being fully expanded and occluding the inner space 112, a fourth bladder 125D (subsequent the third bladder 125C and located across all repeating sections 127 of the tube member 110) expands concomitantly with compression of the second bladder 125D.

At 630, the actuator assembly 115, 215, 315 determines whether to halt the peristaltic method 600. For example, stoppage of the peristaltic transport of the material 105 may occur when the material 105 has been completely transported and thus entirely emitted from the tube member 110. Alternatively, the actuator assembly 115, 215, 315 may receive a control signal indicating a request to halt the peristaltic sequence of occlusions. If the material 105 has been entirely emitted from the tube member 110 or a stoppage control signal has been received by the actuator assembly 115, 215, 315, control passes to 605 and the actuator assembly 115, 215, 315 waits to receive another request for peristaltic transport of the material 105 through the tube member 110.

If no halting of the process has been requested, then control passes back to 610 and the method steps are applied to and propagated along subsequent ones of the plurality of bladders 125 located across the sections 127, as illustrated in time sequence t4-t9 of FIG. 2.

This propagated method 600 across all bladders 125 throughout the tube member 110 forms the peristaltic sequence implemented by the various peristaltic transport systems 100, 200, 300 described herein. It will be recognized by those having ordinary skill in the art that the above recited steps may be implemented in different order without departing from the scope of embodiments of the invention. Additionally, the method 600 may include more or fewer steps than those recited above as deemed necessary to carry out the functions of various embodiments discussed above and in the claims.

Reference will now be made to FIGS. 7A-7D which illustrate a few practical applications of the embodiments described above. Below are just a few practical implementations of the above described embodiments and it will be understood by those of ordinary skill in the art that many other applications exist and are well within the scope of the invention.

Figure 7A:
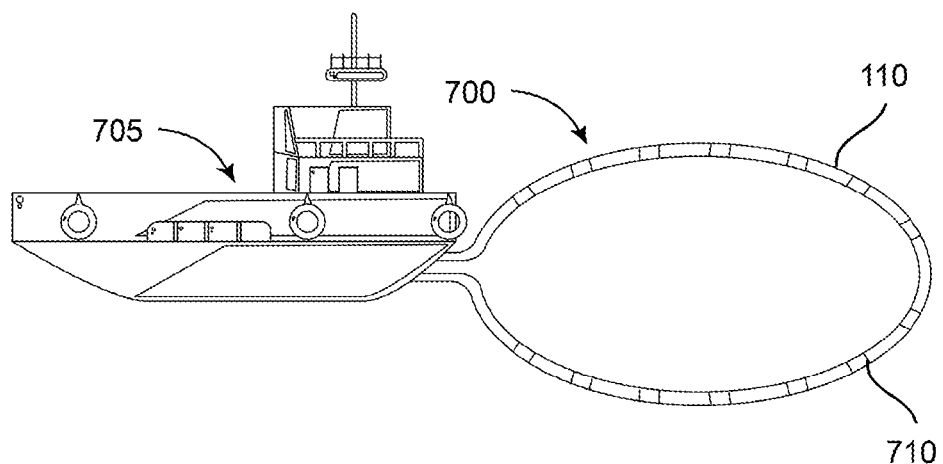
FIG. 7A is a schematic illustration of an oil boom floating on a sea which is towed by a boat, the oil boom embedding the peristaltic transport system therein, according to one embodiment.

Oil Spill Boom:

FIG. 7A shows a schematic illustration of an oil boom 700 floating on a sea which is towed by a boat 705, according to an embodiment. The boom 700 may comprise the tube member 110 described above. The tube member 110 may float on the sea and include a plurality of valves 710, for example one-way valves, that capture the seawater therein. In the event of an oil spill on the sea, the tube member 110 runs a peristaltic sequence on the captured oil-seawater to output clean seawater back into the sea. It will be appreciated to those of ordinary skill in the art that the floating tube member 110 could be used to remove other types of unwanted deposits or muck from the seawater.

Biogas Generator:

Standard configurations of fecal holding tanks require the fecal material to be stirred to cause bacteria to break down the waste. However, fecal waste input into the tube member 110 undergoes the defined peristaltic sequence. This peristaltic sequencing causes mixing that will break down the waste to create methane. Air vents or ports may be coupled to sides of the tube member 110 to allow for release and subsequent capture of the methane. Consequently, the tube member 110 may create useable gas without having to reveal the fecal matter and its associated foul odor to the environment.

Additionally, the peristaltic sequencing of the fecal matter separates water from it. Individual plant cells are found on the fecal waste with water captured inside. As the fecal waste is transported through the tube member 110 via the peristaltic method 600 described above, the plant cell walls are broken and water released. This water is ultimately separated out by the tube member 110.

Figure 7B:
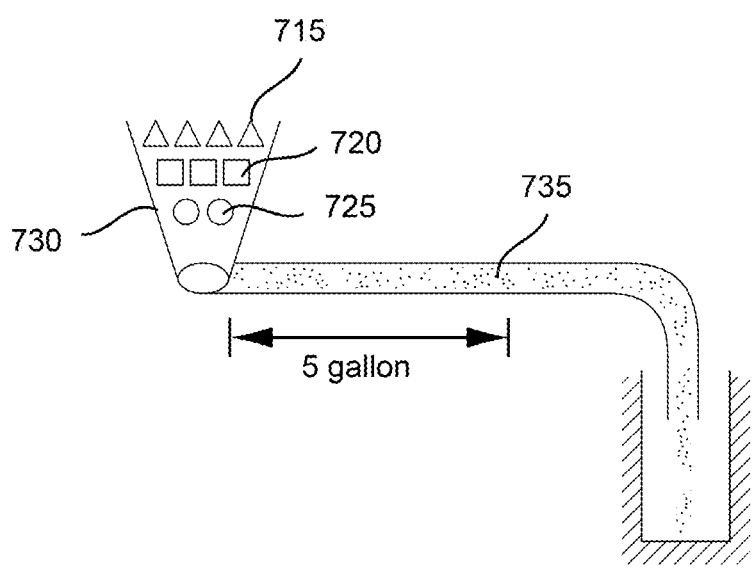
FIG. 7B is a schematic illustration of concrete mixing using the peristaltic transport system, according to one embodiment.

Concrete:

FIG. 7B shows a schematic illustration of concrete mixing using the peristaltic transport system 100, 200, 300 described above, according to one embodiment. Contents, such as sand 715, rocks 720, and water 725, may be added to an intake receptacle 730 coupled to the tube member 110. Contents of the receptacle 730 may be input into the tube member 110 undergoing the defined peristaltic sequence (illustrated in FIG. 2). The peristaltic sequence mixes the contents within the inner space 112 of the tube member 110 and forms a cement mixture 735. For example, after about 5 gallons of the mixture 735 being peristaltically transported through the tube member 110, the cement mixture 735 may be at the desired consistency.

The configuration of FIG. 7B allows for a consistency of the mixture 735 to be altered in real-time, for example, as the cement mixture 735 is being poured. This means that while pouring the cement mixture 735 at a first consistency, the contents added to the receptacle 730 may be altered such that the subsequent 5 gallons or so of the cement mixture 735 will take on a second consistency. Consequently, one may fill a first area of rebar with cement 735 of a first consistency and a second area of rebar with cement 735 of a second consistency. For example, the rebar area may have extra firm cement density along the perimeter and soft cement density in the center.

Figure 7C:
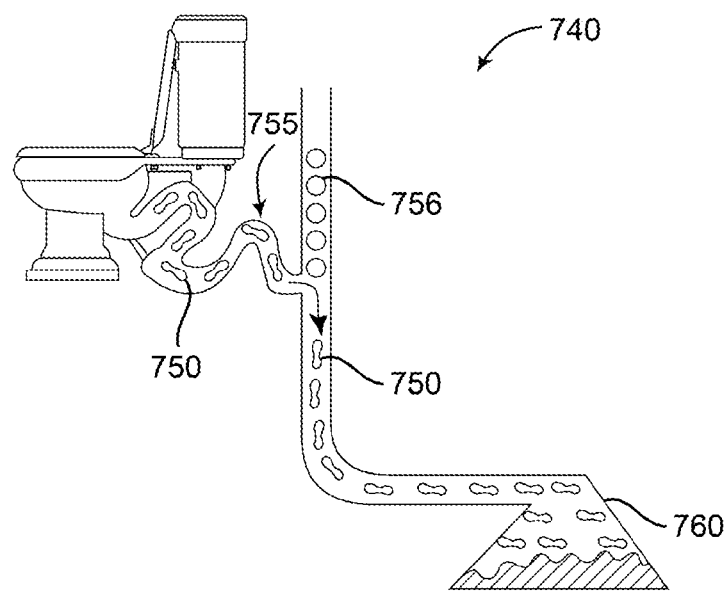
FIG. 7C is a traditional flush toilet system, according to one embodiment.
Figure 7D:
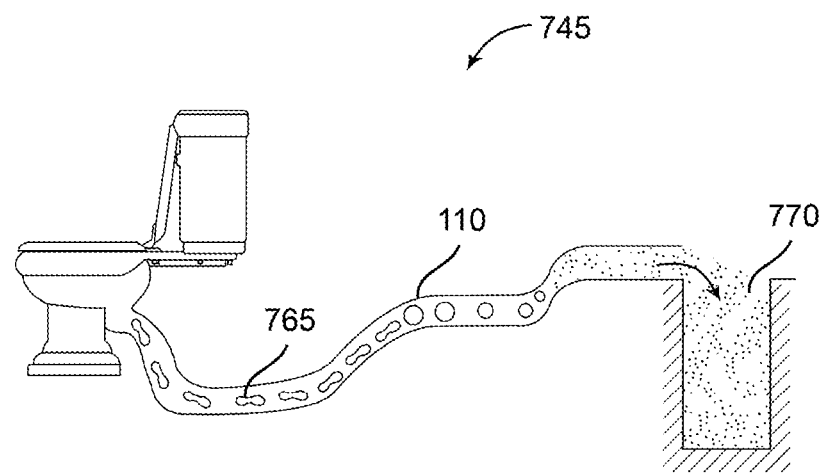
FIG. 7D is a waterless toilet system leveraging the peristaltic transport system, according to one embodiment.

Waterless Toilet:

FIG. 7C shows a traditional flush toilet system 740, while FIG. 7D shows a waterless toilet system 745 leveraging the peristaltic transport system described above, according to one embodiment. The flush toilet system 740 requires the addition of water to convert the fecal waste into slurry 750. Once in a slurry formation 750, the fecal waste may travel to overcome a trap 755 and down toward a sewer 760. The flush toilet system 740 is designed with the trap 755 so that air 756 emanating from the pungent sewer system 760 does not bubble into the toilet and into a house.

The flush toilet system 740 requires an inclined pipe infrastructure to leverage gravity to bring the slurry waste downstream and into the ground. Additionally, the flush toilet system 740 needs to pump out all the slurry stored deep in the ground to recycle the slurry. The waterless toilet system 745 simplifies the toilet system by eliminating the need of water and a powerful pump.

Referring to FIG. 7D, fecal waste 765 that enters the peristaltic transport system travels through the tube member 110 and then outside. For example, 30 feet of peristaltic transport may be sufficient to transform the fecal waste 765 into compost dirt 770. Additionally, a portion of the tube member 110 may be heated, for example, at 160° F. for 4 hours to kill pathogens in the fecal waste 765.

Vertical Water Pumping:

Another practical application of the peristaltic transport system is to pump fluid (e.g., water, oil) from deep beneath the ground to above ground. Such application leverages the useful characteristic of no pressure accumulation within the tube member 110. Each of the repeating sections 127 of the tube member 110 holds its own pressure. In other words, the pressure needed to inflate the bladders 125 of a single section 127 having the material 105 within the inner space 112 is the maximum pressure per section required to transport the material 105 across any distance.

For example, if a well is located 1000 ft below ground level, it is possible to pump water upwards using merely a 100 PSI air compressor. This is because every section 127 of the peristaltic tube member 110 takes care of its own pressure. If the peristaltic tube member 110 comprises 4 ft repeating sections 127, then 6 PSI would be enough to move water upward 1000 ft. This is because 6 PSI of air may be sufficient to inflate the respective bladders 125 within respective ones of the sections 127 and thus cause the fluid to peristaltically transport within each of the respective section 127. Consequently, via the peristaltic transport system 100, 200, 300 discussed above, low pressure would be enough to pump water from 1000 ft below ground level to the ground.

Peristaltic Tube Absorption:

The peristaltic tube member 110 encompasses a large surface area. Sidewalls of the tube member 110 may be designed to absorb certain contaminants embedded within the material 105 as the material 105 is peristaltically transported through the inner space 112. For example, sludge dirt may be the material 105 transported through the inner space 112 of the tube member 110. Certain heavy chemicals embedded within the material 105 may bind to the surface of the inner space 112. For example, sludge dirt might enter the tube member 110 while cadmium exits. It will be understood to those of ordinary skill in the art that other minerals, chemicals, or nutrients may be extracted by the tube member 110 by way of its absorptive properties. For example, the oil-seawater that is captured within the tube member 110 (discussed above) may be peristaltically transported through the inner space 112 while the oil binds to the surface of the inner space 112 and the seawater is filtered through the sidewalls and into the sea. The oil may, for example, be pumped back into the boat 705 for later disposal or use.

Having described some embodiments of the invention, additional embodiments will become apparent to those skilled in the art to which it pertains. Specifically, although reference was made to a peristaltic transport system 100, 200, 300 having an actuator assembly 115, 215, 315 that causes the expansion/compression of bladders 125 disposed within the tube member 110, it will be appreciated by those having ordinary skill in the art that the actuator assembly 115, 215, 315 may alternatively and/or additionally cause constriction of the inner space 112 within the tube member 110 by exerting a mechanical force against the outside walls of the tube member 110. The external mechanical force may occur at select locations and propagate toward the output end 117 of the tube member 110 so as to implement the defined peristaltic sequence. The external mechanical force causes the tube member 110 to compress against itself in those select locations. For example, instead of including the plurality of bladders 125 within the inner space 112, the tube member 110 may be coupled to a plurality of mechanical rollers that exert stress against the tube member 110 to cause occlusion of the inner space 112. The actuator assembly 115, 215, 315 may operate to propagate the mechanical rollers along the repeating sections 127 of the tube member 110 to propagate the volume constriction along the tube member 110, thereby transporting the material 105. In one embodiment, respective ones of the plurality of rollers are disposed along the repeating sections 127 such that a single roller is associated with a single section. As such, the external constriction force applied to the tube member occurs simultaneously at corresponding points along the sections 127 of the tube member 110.

Alternatively and/or additionally to the plurality of rollers, a set of spheres may be connected to a line and disposed within the inner space 112 of the tube member 110. The set of spheres may, for example, be pulled via the line through the inner space 112 and effectively operate to squeegee the material 105 from the tube member 110.

It will be appreciated by those of ordinary skill in the art there are different ways to contribute to constriction of space within the tube member 110. For example, the tube member 110 may undergo variations in length and/or shape at discrete points along its walls. Such variations in shape cause selective constriction of the inner space 112 throughout the repeating sections 127 of the tube member 110. In one embodiment, the walls of the tube member 110 are triggered to swell at specific times and then shrink, thus causing selective constriction of the inner space 112. The triggering may occur in response to the walls of the tube member 110 coming into contact with fluid (e.g., water). The fluid may cause the tube member 110 to shrink at the point of contact while the shrinking contracts the tube member 110, thereby constricting the inner space 112. Conversely, the tube member 110 expands at the point of contact when the fluid evaporates from the external sidewalls of the tube member 110.

Consequently, the constriction of the inner space 113 and the peristaltic sequence described above may occur in response to constricting the external size or circumference of the tube member 110 at select locations, rather than swapping volumes. Of course, the tube member 110 may be constructed of any type of fiber that allows for such shrinking/expanding characteristics.

Although the embodiments described above disclose the use of compressed air to actuate the plurality of bladders 125 to expand/contract, the actuator assembly 115, 215, 315 may control the expansion/contraction of the plurality of bladders 125 by applying at least one of fluid (e.g., water), gas, or the like to the bladders 125.

Additionally, propagating the volume constriction along the tube member 110 may be implemented in response to a mechanical lever (e.g., bellows) manually actuated by a human. As such, the peristaltic transport device 100, 200, 300 may be implemented without the need of a power source.

Finally, it will be appreciated by those of ordinary skill in the art the direction of propagation of the volume constriction along the tube member may be reversed and is not limited to a single directional propagation.

While the particular methods, devices and systems described herein and described in detail are fully capable of attaining the above-described objects and advantages of the invention, it is to be understood that these are the presently preferred embodiments of the invention and are thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "one or more" and not "one and only one", unless otherwise so recited in the claim.

It will be appreciated that modifications and variations of the invention are covered by the above teachings and within the purview of the appended claims without departing from the spirit and intended scope of the invention.

The invention claimed is:

1. A peristaltic transport device, including material embedded therein, comprising: a tube member having an inner space to receive the material, the tube member includes a series of first and second repeating sections wherein each of the first and second sections includes a plurality of bladders to selectively occlude portions of the inner space according to a defined peristaltic sequence to transport the material through the inner space, wherein a first bladder of the plurality of bladders is configured to expand from an inner wall of the tube member and into the inner space, wherein the tube member comprises flexible material, such that the tube member is configured to adapt to flexible shapes for placement through uneven terrain; and an actuator assembly to control the selective occlusion of the inner space by selectively expanding and contracting ones of the plurality of bladders according to the defined peristaltic sequence, the actuator assembly propagates expansion of the first bladder and a second bladder of the plurality of bladders in the first repeating section simultaneously with corresponding expansion of first and second bladders in the second repeating section of the tube member.

2. The peristaltic transport device of claim 1 wherein the first and second bladders of the plurality of bladders across an axial length of each of the series of the first and second repeating sections are interconnected.

3. The peristaltic transport device of claim 2 wherein the first bladder of the plurality of bladders abuts against an opposite inner wall of the tube member.

4. The peristaltic transport device of claim 3 wherein the selectively occluded portions of the inner space includes the expanded first bladder of the plurality of bladders additionally abutted against the expanded second bladder of the plurality of bladders that is adjacent axially along the length of the tube member, wherein the expanded second bladder of the plurality of bladders causes the material to transport away from the expanded first one of the plurality of bladders.

5. The peristaltic transport device of claim 4 wherein the consecutive expansion of the first and second bladders propagated along the plurality of bladders in each of the first and second repeating sections is followed by consecutive compression of the first and second bladders.

6. The peristaltic transport device of claim 2 wherein the actuator assembly includes:
a compressor to supply pressurized air to respective ones of the plurality of bladders via a common supply line; and
a plurality of valves disposed between the common supply line and respective ones of the plurality of bladders to control access of the pressurized air from the common supply line to each of the plurality of bladders.

7. The peristaltic transport device of claim 6, further comprising a controller communicatively coupled to the plurality of valves, the controller instructs respective ones of the plurality of valves whether to allow pressurized air access to the respective ones of the plurality of bladders.

8. The peristaltic transport device of claim 7 wherein each of the plurality of valves has a release component to allow the pressurized air stored in the respective bladder to escape and cause the bladder to deflate.

9. The peristaltic transport device of claim 2 wherein the actuator assembly includes:
a water pump to supply water to respective ones of the plurality of bladders via a common supply line; and
a plurality of valves disposed between the common supply line and respective ones of the plurality of bladders to control access of the water from the common supply line to each of the plurality of bladders.

10. The peristaltic transport device of claim 1 wherein the defined peristaltic sequence includes consecutive expansion of the first and second bladders in each of the first and second repeating sections of the tube member simultaneously.

11. The peristaltic transport device of claim 1 wherein the tube member has a length of at least 10 meters.

12. The peristaltic transport device of claim 1 wherein the material is as least one of fecal sludge, slurry, cement, oil, gasoline, or the like.

13. The peristaltic transport device of claim 1 wherein the actuator assembly causes the plurality of bladders to occlude the inner space in response to respective ones of the bladders being expanded with gas.

* * * * *